United States Patent
Koehnen et al.

(10) Patent No.: US 6,787,227 B2
(45) Date of Patent: Sep. 7, 2004

(54) HIGH-TENACITY YARN WITH PROFILED FILAMENTS

(75) Inventors: Ralf Koehnen, Wuppertal (DE); Frank Leymann, Viersen (DE); Britta Konrad, Wuppertal (DE); Gerhard Berberich, Leidersbach (DE); Hans Albert Graefe, Schwelm (DE); Andreas Tulke, Erlenbach (DE); Qiao Xiao, Erlenbach (DE)

(73) Assignee: Polyamide High Performace GmbH, Wuppertal (DE)

( * ) Notice: Subject to any disclaimer, the term of this patent is extended or adjusted under 35 U.S.C. 154(b) by 0 days.

(21) Appl. No.: 10/421,719

(22) Filed: Apr. 24, 2003

(65) Prior Publication Data

US 2003/0211319 A1 Nov. 13, 2003

(30) Foreign Application Priority Data

Apr. 24, 2002 (EP) .............................. 02009109

(51) Int. Cl.$^7$ .......................... D02G 3/00; D03D 17/00; B60R 21/16
(52) U.S. Cl. ....................... 428/364; 428/397; 428/399; 442/181; 280/728.1
(58) Field of Search ................................ 428/364, 397, 428/399; 280/728.1; 442/182, 181

(56) References Cited

U.S. PATENT DOCUMENTS

| | | | |
|---|---|---|---|
| 5,236,755 A | * | 8/1993 | Howe et al. ............... 428/64.4 |
| 5,236,775 A | | 8/1993 | Swoboda et al. |
| 5,554,424 A | | 9/1996 | Krummheuer et al. |
| 6,153,545 A | * | 11/2000 | LaLonde et al. ............ 442/189 |
| 6,673,442 B2 | * | 1/2004 | Johnson et al. ............. 428/364 |

FOREIGN PATENT DOCUMENTS

| | | |
|---|---|---|
| CA | 2187586 | 4/1997 |
| DE | 1669454 | 10/1969 |
| EP | 0 605 333 A1 | 7/1994 |
| EP | 0 616 061 A1 | 9/1994 |
| EP | 0 773 140 A1 | 5/1997 |
| GB | 1114541 | 5/1968 |
| WO | WO 98/38360 | 9/1998 |

* cited by examiner

*Primary Examiner*—N. Edwards
(74) *Attorney, Agent, or Firm*—Oliff & Berridge, PLC

(57) ABSTRACT

A yarn containing filaments made from synthetic polymers has a cross-section having at least 5 vertices, a titer of 1 to 7 dtex and a tenacity of at least 60 cN/tex. The filaments of the yarn preferably have a cross-section having 5 to 8 vertices, possibly with indentations between the vertices. The cross-section of the filaments is preferably star-shaped. The yarn preferably has a tenacity of 60 to 85 cN/tex, an elongation at break of 15% to 35%, a hot-air shrinkage of 4% to 10% and a stretch recovery of 250 to 400 cN/tex. The yarn is excellently suited for use in the manufacture of industrial fabrics, particularly airbag fabrics.

17 Claims, 2 Drawing Sheets

HIGH-TENACITY YARN WITH PROFILED FILAMENTS

BACKGROUND OF THE INVENTION

1. Field of Invention

The present invention relates to a yarn containing filaments made from synthetic polymers with a cross-section having at least 5 vertices.

2. Description of Related Art

Yarns of this type have been used in the manufacture of textiles and carpets to improve the appearance of the textiles and carpets. In the manufacture of textile fabrics such as wovens, knitted and crocheted fabrics and nonwovens from yarns containing synthetic polymer filaments, it is observed that the fabrics produced show a luster that is often not wanted. The filaments of these yarns therefore often contain matting agents. The luster in textile fabrics can be further reduced by using yarns with a profiled cross-section. Thus in EP 0 605 333, for example, filaments with matting agents and having a multilobal cross-section containing at least 5 lobes are used to manufacture carpets, the filaments in the finished carpet having good crimp shape retainability and no luster. The filaments have an individual titer of 20 dtex.

Luster is of little importance in the manufacture of woven technical fabrics, particularly airbag fabrics. The most important consideration in the manufacture of these fabrics is the use of yarns with filaments having high tenacity and guaranteeing good foldability. Yarns of high tenacity and low individual titer are therefore preferred. Because it has always been assumed by those skilled in the art that yarns with filaments having a profiled cross-section are of lower tenacity than those with filaments of round cross-section, the former have always been regarded as unsuitable for use in woven technical fabrics.

Polyester yarns, particularly polyamide yarns such as nylon 4, nylon 4,6 and especially nylon 6,6, are suitable for manufacturing woven technical fabrics. The finished fabrics should have very low air permeability, particularly in the case of airbag fabrics. The air permeability of these fabrics can be further reduced by coating them, e.g., with silicone, after manufacture. Coating the fabrics is not easy, however, as a coating often does not readily adhere to the highly developed filaments of the yarns used.

SUMMARY OF THE INVENTION

The object of the present invention is to provide a yarn in which the above-mentioned disadvantages in the manufacture and use of technical fabrics, and particularly airbag fabrics, are significantly reduced.

The object is achieved with a yarn containing filaments of synthetic polymers having a cross-section with at least 5 vertices, a titer between 1 and 7 dtex and a tenacity of at least 60 cN/tex.

It has been shown that woven fabrics produced from yarns of this type have intrinsically lower air permeability than those produced from yarns comprising filaments of round or oval cross-section, and also show significantly improved adhesion properties for coating materials. It was also surprisingly found that yarns comprising filaments of which the cross-section has a number of vertices can be manufactured so as to have high tenacity.

DETAILED DESCRIPTION OF PREFERRED EMBODIMENTS

Preferably, in the yarn of the invention, the cross-section of the filaments has 5 to 8 vertices, whereby it is further particularly favorable if the filament cross-section has indentations between the vertices.

It is also preferable in the yarn of the invention for the cross-section of the filaments to be star-shaped, whereby it is further particularly favorable if the vertices of the filament cross-section are rounded.

Preferably, the filaments, and also the yarn consisting of these filaments, have a tenacity of 60 to 85 cN/tex. Tenacities of 65 cN/tex and higher are particularly preferred.

Preferably, the filaments, and also the yarn consisting of these filaments, have an elongation at break of 15% to 35%.

A preferred embodiment of the present invention comprises a yarn in which the filaments, and the yarn consisting of these filaments, have a hot-air shrinkage, measured at 190° C. over 15 minutes, of 4% to 10%. It is possible after manufacture to condense the fabric further by initiating shrinkage, which allows the air permeability of this fabric to be further reduced.

The yarn of the invention is preferably comprised of filaments having a stretch recovery of 250 to 400 cN/tex. As is well known, the stretch recovery is determined by the product of the tenacity and the square root of the elongation.

The use of the yarn of the invention for manufacturing woven technical fabrics, and particularly airbag fabrics, is particularly advantageous.

Fabrics containing the yarns of the invention are excellently suited for use in the manufacture of airbags. The fabrics exhibit particularly low air permeability. The air permeability of the fabrics can be further reduced by coating them with a coating of, for example, silicone after manufacture. Moreover, such a coating adheres particularly well to this type of fabric, so that in the processing of these coated fabrics to airbags there is no risk of damaging the coating, and the air permeability arising from the fabric structure and the subsequent coating is therefore also present in the finished airbag. The risk of detaching the coating through folding of the airbag is also significantly reduced.

As the polymer material suitable for use in making the filaments of the yarns of the invention, mention may be made of, for example, polyester and polyamide such as nylon, in particular nylon 4, nylon 4,6 or nylon 6,6. Polyamides such as nylon 6,6 are particularly preferred.

The invention will now be further explained with the help of the following examples.

EXAMPLES

Figure 1:
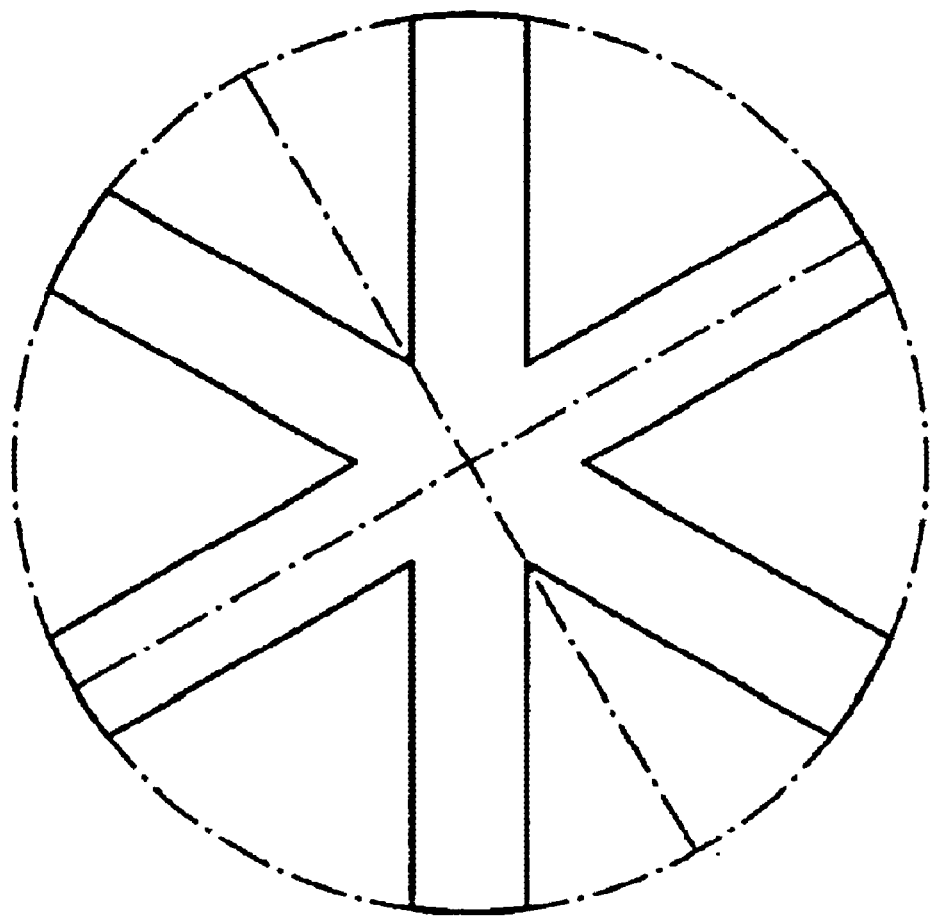
FIG. 1 is a cross-sectional view of an example spinneret through which polymer is extruded in forming filaments of the yarn of the invention.

Nylon 6,6 with a granular viscosity of 2.56 (255 G) is used as the polymer in manufacturing the yarns. The nylon 6,6 granulate is melted at a temperature of 290° C. and extruded through a spinneret of diameter 60 mm at a temperature of 280.5° C., each of the 72 orifices of the spinneret having three rectangles, each of length 600 µm and width 70 µm (see FIG. 1), arranged in the shape of a star and connected to each other at the center. The extruded filaments are quenched with cross-flow air at various speeds at a temperature of 22° C. in a quenching cell, and then wound up at a speed of 450 m/min. The pressures set at the spinneret, the air speeds employed and the properties of the yarns obtained are shown in Table 1.

With an airflow of 50 m³/h, the filaments obtained have a hexagonal cross-section, which becomes distinctly star-shaped as the air speed increases.

In a second operation, the yarns so produced are drawn by 1:4.326 and then relaxed by 1:0.925, the stretching occurring between a first and second roll and the relaxation between a second and third roll. A heating plate is also placed between the first and second roll. The temperature of the first roll is 97° C., that of the heating plate is 190° C., that of the second roll is 230° C. and that of the third roll, 90° C. The properties of the yarns so obtained are listed in Table 2. All the yarns show a hot-air shrinkage of 4.7%.

TABLE 1

| No. | Spinneret pressure bar | Air flow m³/h | Titer Dtex | Elongation % | Tenacity cN/tex | Uster % |
|---|---|---|---|---|---|---|
| 1 | 180 | 50 | 998 | 417 | 12.8 | 5.7 |
| 2 | 180 | 100 | 982 | 418.4 | 12.8 | 6.1 |
| 3 | 180 | 150 | 989 | 414.6 | 13.6 | 3.5 |
| 4 | 182 | 200 | 990 | 400.1 | 13.6 | 1.3 |
| 5 | 182 | 250 | 984 | 391.2 | 13.9 | 1.2 |
| 6 | 184 | 300 | 981 | 385.3 | 14.0 | 1.2 |
| 7 | 184 | 350 | 985 | 372 | 14.1 | 1.8 |

TABLE 2

Figure 2:
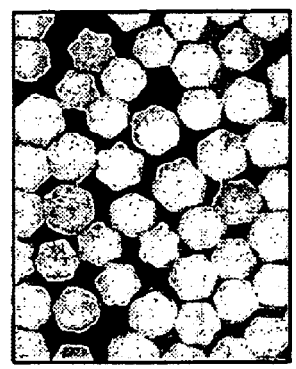
FIGS. 2–5 are cross-sectional views of yarns of the invention.
Figure 3:
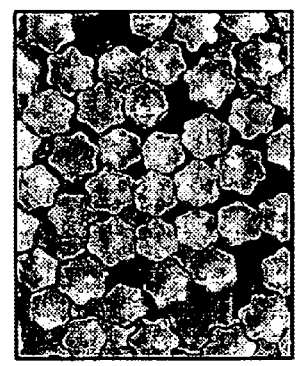
Figure 4:
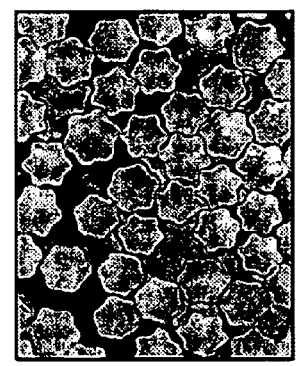
Figure 5:
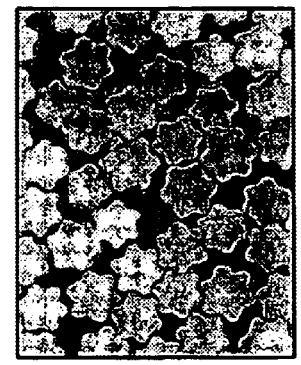

| No. | Titer Dtex | Elongation % | Tenacity cN/tex | Stretch recovery cN/tex | Cross-section of yarn |
|---|---|---|---|---|---|
| 1 | 240.8 | 23.9 | 65.5 | 320 | hexagonal |
| 2 | 238.9 | 23.2 | 66.5 | 320 | |
| 3 | 239.2 | 20.5 | 65.1 | 295 | FIG. 2 |
| 4 | 241.2 | 20.4 | 67.0 | 303 | FIG. 3 |
| 5 | 239.3 | 18.9 | 67.3 | 293 | |
| 6 | 240.5 | 19.2 | 68.9 | 302 | FIG. 4 |
| 7 | 238.7 | 17.3 | 69.2 | 288 | FIG. 5 |

The cross-sections of the yarns obtained are shown in FIGS. 2–5. It is clear that blowing air into the spinning cabinet at low speed yields filaments of hexagonal cross-section, while higher air speeds yield filaments of star-shaped cross-section.

Comparable yarns with filaments of round cross-section have a tenacity of about 69 cN/tex, an elongation of about 24% and hot-air shrinkage of about 7.8%.

It is found that for woven fabrics manufactured using these yarns, the air permeability, compared with that for yarns made from filaments of round cross-section, decreases as the cross-section of the filaments of the yarns used becomes more distinctly star-shaped. It is also found that the adhesion of a silicone coating improves as the cross-section of the filaments becomes more distinctly star-shaped. Thus, the yarns of the invention can be used to provide, in a particularly convenient manner, the desired low air permeability, and values of air permeability that are particularly low, in airbag fabrics.

What is claimed is:

1. A yarn containing filaments made of synthetic polymers with a cross-section having at least 5 vertices, a titer of 1 to 7 dtex, a tenacity of at least 60 cN/tex and a stretch recovery of 250 to 400 cN/tex.

2. Yarn according to claim 1, wherein the cross-section of the filaments has 5 to 8 vertices.

3. Yarn according to claim 1, wherein the cross-section of the filaments has indentations between the vertices.

4. Yarn according to claim 3, wherein the cross-section of the filaments is star-shaped.

5. Yarn according to claim 1, wherein the vertices are rounded.

6. Yarn according to claim 1, wherein the filaments have a tenacity of 60 to 85 cN/tex.

7. Yarn according to claim 1, wherein the filaments have an elongation at break of 15% to 35%.

8. Yarn according to claim 1, wherein the filaments have a hot-air shrinkage, measured at 190° C. over 15 minutes, of 4% to 10%.

9. Yarn according to claim 1, wherein the filaments are comprised of polyester or polyamide.

10. Yarn according to claim 9 wherein the filaments are comprised of nylon 6,6.

11. Yarn according to claim 1, wherein the yarn includes a coating thereon.

12. Yarn according to claim 11, wherein the coating is silicone.

13. An industrial fabric comprised of the yarn according to claim 1.

14. Woven fabrics containing the yarns according to claim 1.

15. An airbag comprised of a fabric, wherein the fabric is comprised of a yarn containing filaments made of synthetic polymers with a cross-section having at least 5 vertices, a titer of 1 to 7 dtex, a tenacity of at least 60 cN/tex and a stretch recovery of 250 to 400 cN/tex.

16. Airbag according to claim 15, wherein the yarn includes a coating thereon.

17. Airbag according to claim 16, wherein the coating is silicone.

* * * * *